US008265433B2

(12) United States Patent
Zheng et al.

(10) Patent No.: US 8,265,433 B2
(45) Date of Patent: Sep. 11, 2012

(54) LOW-POWER, BROADBAND OPTICAL SWITCH

(75) Inventors: Xuezhe Zheng, San Diego, CA (US); Jin Yao, San Diego, CA (US); Ashok V. Krishnamoorthy, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 190 days.

(21) Appl. No.: 12/759,781

(22) Filed: Apr. 14, 2010

(65) Prior Publication Data
US 2011/0255822 A1 Oct. 20, 2011

(51) Int. Cl.
*G02B 6/26* (2006.01)

(52) U.S. Cl. ................ 385/25; 385/16; 385/50

(58) Field of Classification Search .......... None
See application file for complete search history.

(56) References Cited

U.S. PATENT DOCUMENTS

| | | | | |
|---|---|---|---|---|
| 3,589,794 A * | 6/1971 | Marcatili | ........................ | 385/42 |
| 5,078,514 A * | 1/1992 | Valette et al. | .................... | 385/20 |
| 5,612,815 A * | 3/1997 | Labeye et al. | ................. | 359/320 |
| 5,796,886 A * | 8/1998 | Hong et al. | ..................... | 385/21 |
| 6,411,752 B1 * | 6/2002 | Little et al. | ...................... | 385/17 |
| 6,625,356 B2 * | 9/2003 | Ticknor et al. | .................. | 385/39 |
| 6,658,176 B2 * | 12/2003 | Amantea | ......................... | 385/16 |
| 6,665,476 B2 * | 12/2003 | Braun et al. | .................... | 385/50 |
| 6,751,377 B2 * | 6/2004 | Baumann et al. | ............... | 385/32 |
| 6,839,479 B2 * | 1/2005 | Berger et al. | .................... | 385/16 |
| 6,990,264 B2 * | 1/2006 | Telkamp et al. | ................. | 385/16 |
| 7,099,527 B2 * | 8/2006 | Ogawa | ............................ | 385/16 |
| 7,477,812 B2 * | 1/2009 | Nielson et al. | .................. | 385/16 |

FOREIGN PATENT DOCUMENTS
WO WO 02/082140 A1 * 10/2002

* cited by examiner

*Primary Examiner* — M. Stahl
(74) *Attorney, Agent, or Firm* — Park, Vaughan, Fleming & Dowler LLP; Steven E. Stupp (57) ABSTRACT

An optical switch is described that includes two optical waveguides, which are defined in a semiconductor layer, positioned proximate to an intermediate component, such as a micro-resonator or a directional coupler. Material underneath a portion of either or both optical waveguides is removed so that the portion of either or both optical waveguides is free standing, and a group of electrodes is proximate to the free-standing portion of either or both optical waveguides. During operation of the optical switch, a spacing-control circuit applies an electrical signal to the group of electrodes. An electrostatic force associated with the electrical signal modifies a spacing between the free-standing portion of either or both optical waveguides and the intermediate component, thereby substantially increasing optical coupling between either or both optical waveguides and the intermediate component to convey a broadband optical signal between the optical waveguides.

18 Claims, 10 Drawing Sheets

```
┌─────────────────────────────────────────────────────────────┐
│ CONVEY AN OPTICAL SIGNAL IN A FIRST OPTICAL WAVEGUIDE       │
│ DEFINED IN A SEMICONDUCTOR LAYER IN AN INTEGRATED CIRCUIT,  │
│ WHERE MATERIAL UNDERNEATH A PORTION OF THE FIRST OPTICAL    │
│ WAVEGUIDE IS REMOVED SO THAT THE PORTION IS FREE STANDING   │
│                           1010                              │
└─────────────────────────────────────────────────────────────┘
                              │
                              ▼
┌─────────────────────────────────────────────────────────────┐
│ PROVIDE AN ELECTRICAL SIGNAL TO A GROUP OF FIRST ELECTRODES │
│ PROXIMATE TO THE FREE-STANDING PORTION OF THE FIRST OPTICAL │
│ WAVEGUIDE SO THAT AN ELECTROSTATIC FORCE ASSOCIATED WITH THE│
│ ELECTRICAL SIGNAL MODIFIES A SPACING BETWEEN THE FREE-STANDING│
│ PORTION OF THE FIRST OPTICAL WAVEGUIDE AND AN INTERMEDIATE  │
│             COMPONENT IN THE INTEGRATED CIRCUIT             │
│                           1012                              │
└─────────────────────────────────────────────────────────────┘
                              │
                              ▼
┌─────────────────────────────────────────────────────────────┐
│ OPTICALLY COUPLE A BROADBAND OPTICAL SIGNAL FROM THE FIRST  │
│ OPTICAL WAVEGUIDE TO THE INTERMEDIATE COMPONENT, AND FROM THE│
│ INTERMEDIATE COMPONENT TO A SECOND OPTICAL WAVEGUIDE, WHICH IS│
│ DEFINED IN THE SEMICONDUCTOR LAYER, AND WHICH IS PROXIMATE TO│
│                  THE INTERMEDIATE COMPONENT                 │
│                           1014                              │
└─────────────────────────────────────────────────────────────┘
```

FIG. 10

LOW-POWER, BROADBAND OPTICAL SWITCH

GOVERNMENT LICENSE RIGHTS

The United States Government has a paid-up license in this invention and the right in limited circumstances to require the patent owner to license others on reasonable terms as provided for by the terms of Agreement No. HR0011-08-9-0001 awarded by the DARPA.

BACKGROUND

1. Field

The present disclosure relates to techniques for communicating optical signals. More specifically, the present disclosure relates to a low-power, broadband optical switch that is electrostatically actuated.

2. Related Art

Silicon photonics is a promising technology that can provide large communication bandwidth and low power consumption needed to facilitate inter- and intra-chip interconnections. For example, a point-to-point communication network can be established using silicon-photonic devices and links to interconnect a large number of processor cores in a manner that achieves scalable performance with affordable manufacturing and energy costs.

One of the building blocks in inter- and intra-chip silicon-photonic interconnects is a silicon-waveguide optical switch. The silicon-waveguide optical switch enables an optical signal, or bundles of optical signals, to be selectively redirected from one optical waveguide to another. Consequently, the silicon-waveguide optical switch can play an important role in facilitating reconfigurable networks and interconnects, as well as in providing dynamic bandwidth provisioning. This component is particularly useful in circuit-switching architectures.

In large-scale, wavelength-division multiplexing (WDM) optical networks or interconnects, the number of optical switches can be enormous. Therefore, it is desirable for these optical switches to have: low power consumption, low optical loss, a high ON/OFF extinction ratio (ER), and a compact size.

Also, because multiple wavelength channels may be switched simultaneously, broadband optical switches are often needed. A variety of techniques have been proposed to implement a broadband optical switch. These techniques include mechanical actuation, such as in a microelectromechanical system (MEMS). For example, using MEMS, an optical fiber can be physically shifted to drive an optical signal onto one or more additional optical fibers.

Other techniques have been used to implement a broadband optical switch including techniques that take advantage of: electro-optic effects, magneto-optic effects, and thermal-optic effects. For example, a Mach-Zehnder interferometer (MZI) has been used to build 1×2 and 2×2 broadband, silicon-waveguide optical switches, using either the thermal-optic effect or an electro-optic effect (such as carrier injection or carrier depletion) during switching. In a typical MZI silicon-waveguide optical switch that is based on thermal-optic switching, a thermal phase tuner (such as a heater) is integrated into one 'arm' of an MZI to adjust its phase relative to the other reference 'arm.' In this way, the thermal phase tuner controls the output light intensity induced by the interference of light in the two arms. Similarly, in a typical MZI silicon-waveguide optical switch that is based on electro-optic switching, an electro-optical phase tuner uses carrier injection or carrier depletion to adjust the relative phase. This can increase the switching speed, at the cost of higher insertion loss associated with carrier absorption.

Note that because of the relatively small dependence of index-of-refraction in silicon on temperature or applied voltage, MZI silicon-waveguide optical switches are typically large (with lengths of several millimeters), and have significant power consumption. Because these characteristics are sub-optimal for inter- or intra-chip interconnects, to date these optical switches have typically been used in telecommunications.

In order to reduce the size of MZI silicon-waveguide optical switches, a ring-resonator silicon-waveguide optical switch has been proposed, using either the thermal-optic effect or the electro-optic effect during switching. By using ring resonators, the size of the optical switch can be a couple of orders smaller than those that include an MZI. However, ring resonators are usually very sensitive to wavelength. Consequently, optical switches that include ring-resonators are typically wavelength selective or very narrow band.

While the periodic resonances of the ring resonators can offer pseudo-broadband capability, tuning is typically needed to overcome the resonance shifts associated with manufacturing tolerances and changes in the ambient temperature. The sensitivity to changes in the ambient temperature can, at least in part, be addressed by a high-order ring-resonator optical switch that includes multiple coupled ring resonators. However, this approach often cannot tolerate the resonance shift associated with manufacturing tolerances, which can be as large as tens of nanometers. In addition, optical switches with multiple-coupled ring resonators are larger, and have higher tuning and switching power consumption than optical switches with a single ring resonator.

Hence, what is needed is a broadband optical switch without the above-described problems.

SUMMARY

One embodiment of the present disclosure provides an integrated circuit that includes an optical switch. In this optical switch, a first optical waveguide and a second optical waveguide are defined in a semiconductor layer, and a material underneath a portion of the first optical waveguide is removed so that the portion is free standing. Moreover, an intermediate component is positioned proximate to the first optical waveguide and the second optical waveguide, and a group of first electrodes is proximate to the free-standing portion of the first optical waveguide. Furthermore, a spacing-control circuit applies an electrical signal to the group of first electrodes. An electrostatic force associated with the electrical signal modifies a spacing between the free-standing portion of the first optical waveguide and the intermediate component, thereby substantially increasing optical coupling between the first optical waveguide and the intermediate component. In this way, a broadband optical signal, which includes a range of wavelengths greater than a predefined value (such as 10 nm), is conveyed from the first optical waveguide to the second optical waveguide via the intermediate component.

Note that the intermediate component may include a micro-resonator and/or a directional coupler.

Additionally, the spacing-control circuit may include a current source, and the electrical signal may include a current. Alternatively, the spacing-control circuit may include a voltage source, and the electrical signal may include a voltage.

Moreover, the spacing may be associated with a displacement of the free-standing portion of the first optical waveguide in the plane of the semiconductor layer and/or perpendicular to the plane of the semiconductor layer.

In some embodiments, the semiconductor includes silicon. Furthermore, the integrated circuit may include a substrate and a buried-oxide layer disposed on the substrate, where the semiconductor layer is disposed on the buried-oxide layer. For example, the substrate may include a semiconductor. Therefore, the substrate, the buried-oxide layer and the semiconductor layer may constitute a silicon-on-insulator technology.

In some embodiments, a material underneath a portion of the second optical waveguide is removed so that the portion is free standing. In these embodiments, the integrated circuit includes another group of second electrodes proximate to the free-standing portion of the second optical waveguide, and the spacing-control circuit applies another electrical signal to the other group of second electrodes. An electrostatic force associated with the other electrical signal modifies a spacing between the free-standing portion of the second optical waveguide and the intermediate component, thereby substantially increasing optical coupling between the second optical waveguide and the intermediate component so that the broadband optical signal is conveyed from the first optical waveguide to the second optical waveguide via the intermediate component. Note that the electrical signal may be different than the other electrical signal.

Another embodiment provides a system that includes the integrated circuit.

Another embodiment provides a method for selectively optically coupling the broadband optical signal in the integrated circuit. During this method, the optical signal is conveyed in the first optical waveguide defined in the semiconductor layer in the integrated circuit, where the material underneath the portion of the first optical waveguide is removed so that the portion is free standing. Then, the electrical signal is provided to the group of first electrodes proximate to the free-standing portion of the first optical waveguide so that an electrostatic force associated with the electrical signal modifies the spacing between the free-standing portion of the first optical waveguide and the intermediate component in the integrated circuit, thereby substantially increasing optical coupling between the first optical waveguide and the intermediate component. Next, the broadband optical signal, which includes the range of wavelengths greater than the predefined value, is optically coupled from the first optical waveguide to the intermediate component, and is optically coupled from the intermediate component to the second optical waveguide. Note that the second optical waveguide is defined in the semiconductor layer, and is proximate to the intermediate component.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an integrated circuit that includes an optical switch, a system that includes the integrated circuit, and a technique for selectively optically coupling a broadband optical signal are described. In the optical switch, two optical waveguides, which are defined in a semiconductor layer, are positioned proximate to an intermediate component, such as a micro-resonator or a directional coupler. Material underneath a portion of either or both optical waveguides is removed so that the portion of either or both optical waveguides is free standing, and a group of electrodes is proximate to the free-standing portion of either or both optical waveguides. During operation of the optical switch, a spacing-control circuit applies an electrical signal to the group of electrodes. An electrostatic force associated with the electrical signal modifies a spacing between the free-standing portion of either or both optical waveguides and the intermediate component, thereby substantially increasing optical coupling between either or both optical waveguides and the intermediate component. In this way, a broadband optical signal, which includes a range of wavelengths greater than a predefined value (such as 10 nm), is conveyed between the optical waveguides via the intermediate component.

By selectively optically coupling the optical signal in the integrated circuit, the optical switch provides broadband switching with: small size, low optical loss and/or low power consumption. Furthermore, the optical switch may not need to be tuned. Consequently, the optical switch may help facilitate high-speed inter- and intra-chip silicon-photonic interconnects, as well as associated systems that can include this component (such as high-performance computing systems).

Figure 1:
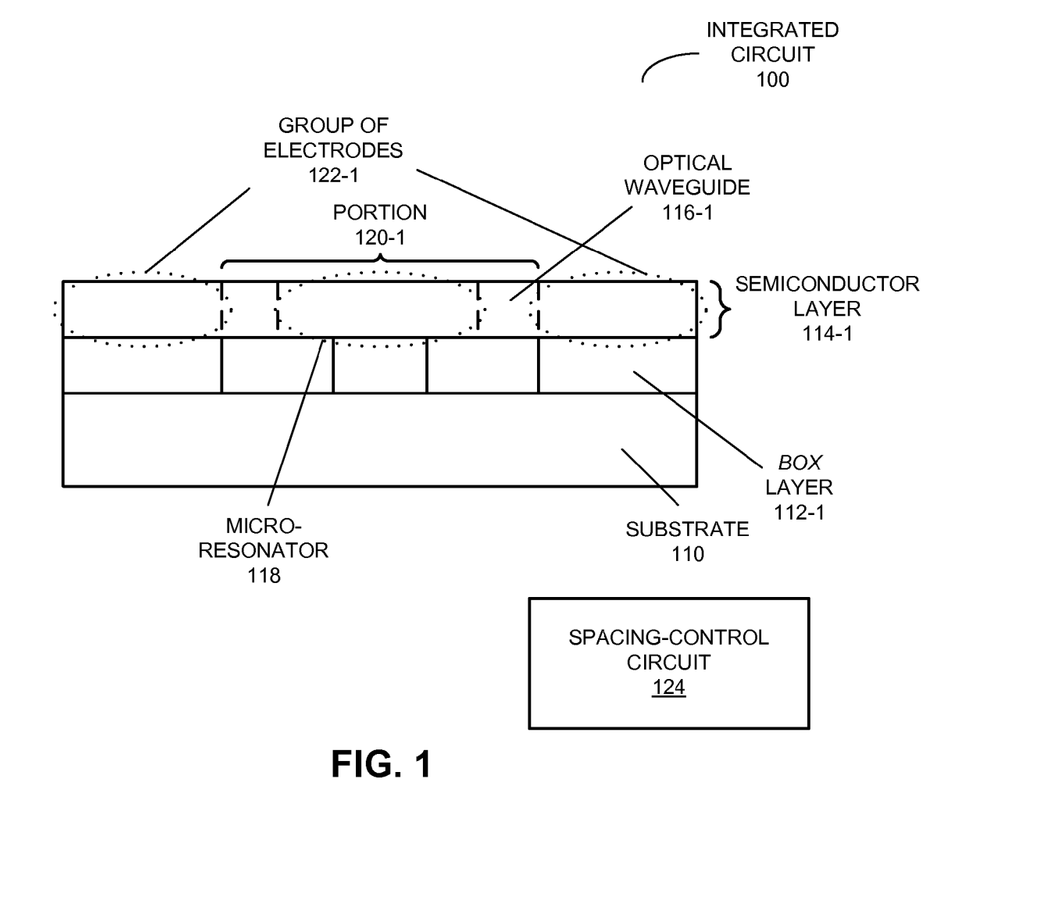
FIG. 1 is a block diagram illustrating a cross-sectional view of an optical switch in an integrated circuit in accordance with an embodiment of the present disclosure.
Figure 2:
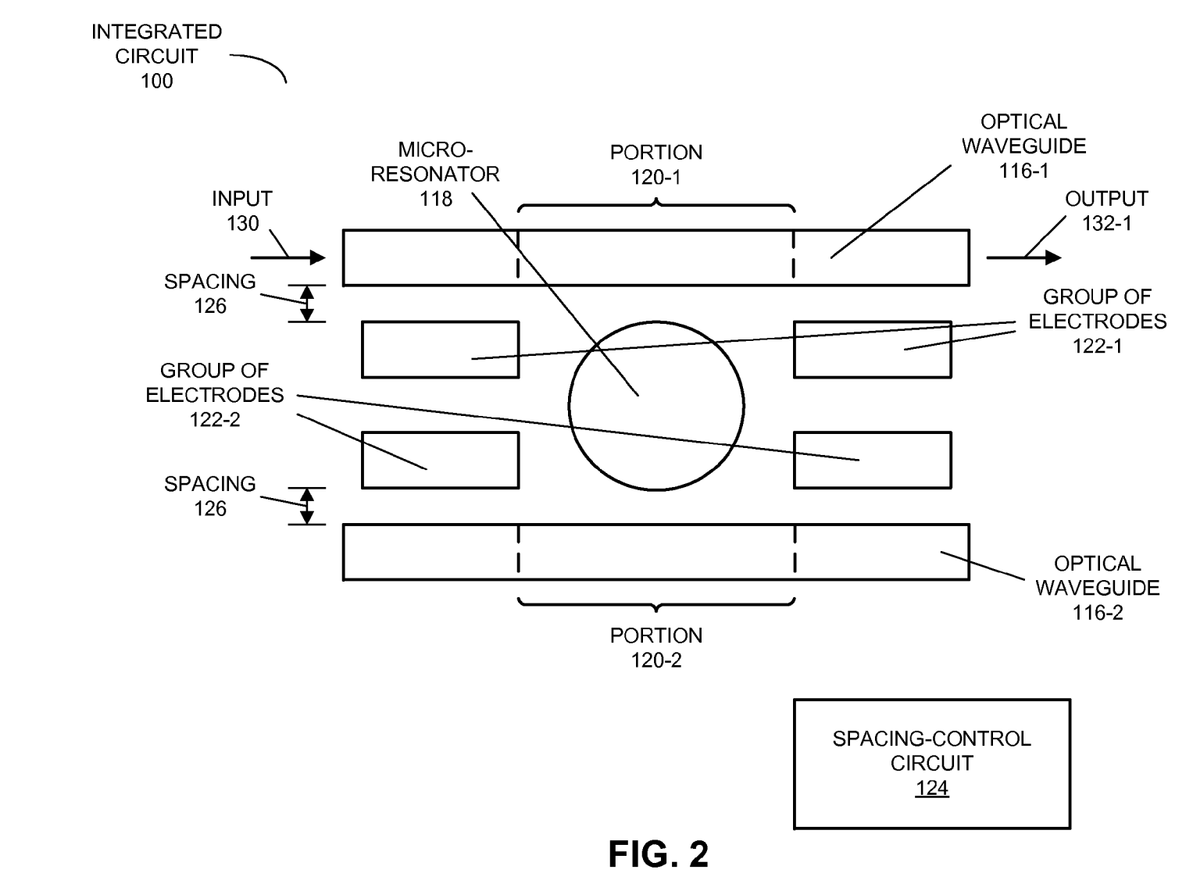
FIG. 2 is a block diagram illustrating a top view of the optical switch in the integrated circuit of FIG. 1 in accordance with an embodiment of the present disclosure.
Figure 3:
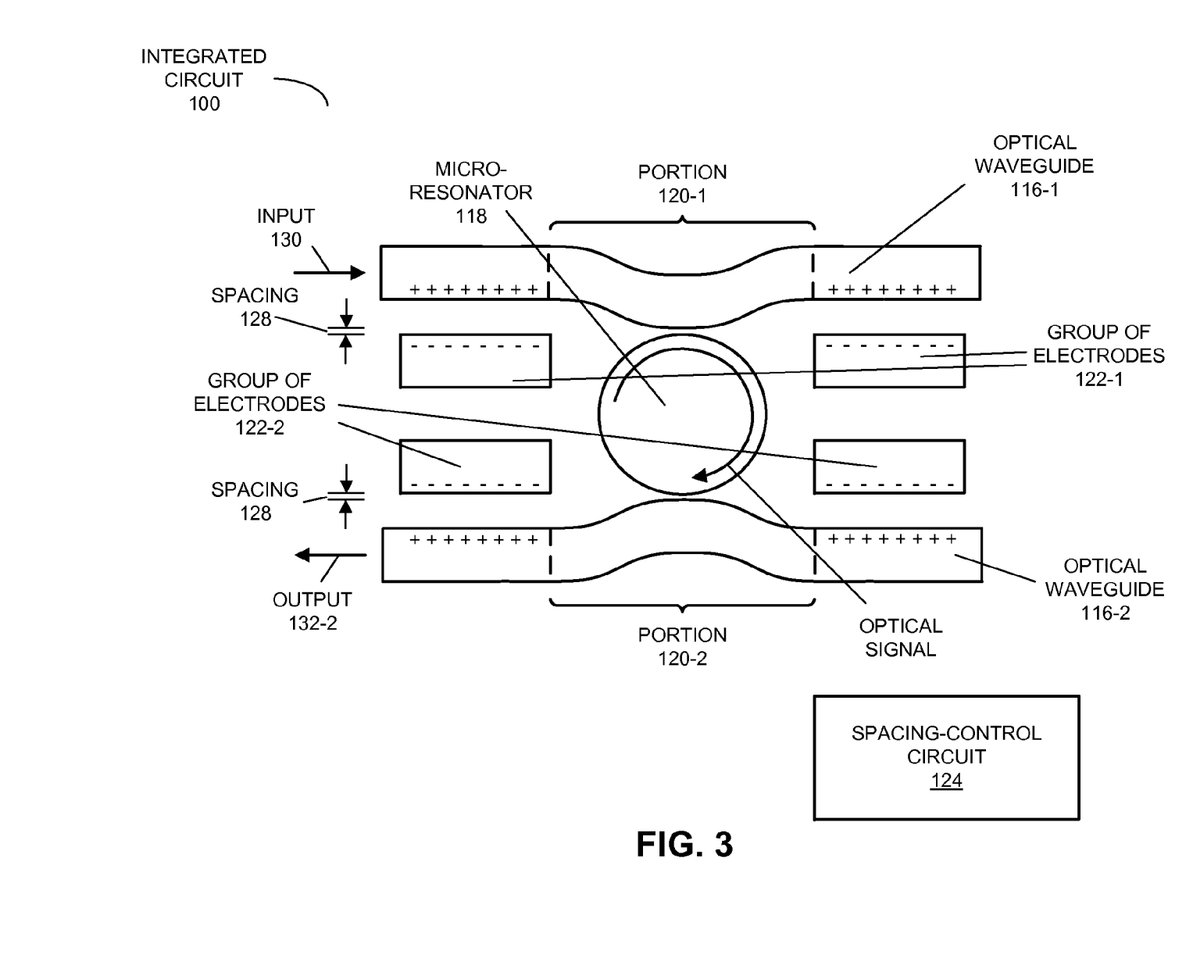
FIG. 3 is a block diagram illustrating a top view of the optical switch in the integrated circuit of FIG. 1 in accordance with an embodiment of the present disclosure.

We now describe embodiments of an integrated circuit that includes a microelectromechanical system (MEMS) optical switch. FIG. 1 presents a block diagram illustrating a cross-sectional view of an optical switch in integrated circuit 100, and FIGS. 2 and 3 present block diagrams illustrating a top view of the optical switch in integrated circuit 100 when the optical switch is, respectively, open or closed. In the optical switch, optical waveguides 116 (which are defined in semiconductor layer 114-1) are used as buses, and a proximate intermediate component (such as micro-resonator 118) is used to selectively couple optical signals between optical waveguides 116. In particular, material in buried-oxide (BOX) layer 112-1 underneath either or both of optical waveguides 116 is removed during fabrication (for example, by etching away the material in BOX layer 112-1) so that one or more portions 120 of either or both optical waveguides 116 are free standing, while the remainder of optical waveguides 116 is supported by BOX layer 112-1. Furthermore, one or more groups of electrodes 122 are defined in semiconductor layer 114-1 proximate to portions 120.

During operation of the optical switch, a spacing-control circuit 124 applies an electrical signal(s) to either or both of the one or more groups of electrodes 122. (Note that the electrical signal applied to group of electrodes 122-1 may be the same or different than the electrical signal applied to group of electrodes 122-2 in FIG. 2.) For example, spacing-control circuit 124 may include a current source, and a given electrical signal applied to a particular group of electrodes may include a current. Alternatively, spacing-control circuit 124 may include a voltage source, and the given electrical signal applied to the particular group of electrodes may include a voltage (such as 100 V) relative to optical waveguides 116.

As shown in FIG. 3, this electrical signal(s) transfers charge to the one or more groups of electrodes 122. The resulting electrostatic force(s) modifies the spacing between either or both portions 120 and micro-resonator 118 from spacing 126 in FIG. 2 to spacing 128 in FIG. 3 by displacing either or both portions 120 in a plane of semiconductor layer 114-1, thereby substantially increasing optical coupling between either or both optical waveguides 116 and micro-resonator 118. (Thus, in some embodiments activating the optical switch may involve moving both portions 120, while in other embodiments activating the optical switch may involve moving only one portion, such as in an optical switch that only includes the one portion.) In particular, in FIG. 2 spacing 126 (such as a spacing of 1-3 µm) is selected so that there is almost zero coupling in the absence of electrical signal(s), and spacing 128 (such as a spacing of 10 nm) is selected so that the optically coupling is increased exponentially relative to the open state of the optical switch.

In this way, a broadband optical signal, which includes a range of wavelengths greater than a predefined value (such as 10 nm), is conveyed between optical waveguides 116 via micro-resonator 118. In particular, as shown in FIGS. 2 and 3, by applying the electrical signal(s) the optical switch transitions from a bar state (in which the optical signal is conveyed from input 130 to output 132-1) to a cross state (in which the optical signal is conveyed from input 130 to output 132-2), as illustrated by the circulating optical signal in micro-resonator 118 in FIG. 3.

Thus, by electrostatically actuating the MEMS optical switch, the optical coupling between either or both optical waveguides 116 and micro-resonator 118 may be selectively modified or adjusted between a de-coupled regime (with a high extinction ratio) and an over-coupled regime over the range of wavelengths. Furthermore, power is only consumed in the optical switch when the spacing between either or both portions 120 and micro-resonator 118 are modified. Consequently, the optical switch can be used in broadband, low-power optical switching applications, such as inter- and intra-chip interconnects. For example, the range of wavelengths may be as large as hundreds of nanometers (as opposed to a narrowband 0.2-0.3 nm single wavelength channel in a typical optical link). In an exemplary embodiment, the predefined value of the range or wavelengths is between 10 and 80 nm.

Note that the switching speed of the optical switch is determined by the mechanical structure of portions 120 of optical waveguides 116 and the electrical signal(s) (such as the applied voltage). In embodiments in which portions 120 have lengths of a few tens of micrometers, millisecond switching speed can be achieved. This may be suitable for circuit switching in an optical network.

Referring back to FIG. 1, in an exemplary embodiment substrate 110 includes silicon, buried-oxide layer 112-1 includes a dielectric or an oxide (such as silicon dioxide), and/or semiconductor layer 114-1 includes silicon. Therefore, substrate 110, buried-oxide layer 112-1 and semiconductor layer 114-1 may constitute a silicon-on-insulator (SOI) technology. Note that the use of SOI technology may allow precise etching of BOX layer 112-1 underneath portions 120. Furthermore, the silicon in semiconductor layer 114-1 may be 0.5 µm thick, and the silicon-dioxide layer may have a thickness between 0.001 and 10 µm. However, a wide variety of materials and geometries may be used in the optical switch.

Similarly, a wide variety of process techniques may be used to remove the material in BOX layer 112-1 under portions 120. For example, the material in BOX layer 112-1 may be removed using a chemical etch process, such as a wet etch process based on hydroxides (such as KOH, TMAH, etc.), or a dry etch process may use one or more fluorine gases (such as $CF_4$, $CHF_3$, $SF_6$, etc.). However, these techniques may be combined and/or supplemented with one or more other chemical processes.

In an exemplary embodiment, a 10 dB/cm waveguide and micro-resonator loss is assumed, $K_1$ and $K_2$ are the optical-coupling coefficients between optical waveguides 116 and micro-resonator 118, and Q is the quality factor of micro-resonator 118. For a micro-resonator 118 having a radius of 12 µm and $K_1=K_2=0.995$, the simulated cross-bar transmittance between input 130 and output 132-2 in the over-coupled regime (i.e., the cross-bar state) is approximately 0.99% for wavelengths between 1.52 and 1.6 µm, and in the de-coupled regime (i.e., the bar state) the optical coupling is negligible. Stated differently, in the cross-bar state, the optical loss is very low. In particular, the insertion loss is at worst 0.18 dB, and the loss uniformity is 0.085 dB over the range of wavelengths. Furthermore, the calculated unloaded Q is 55,500.

Figure 4:
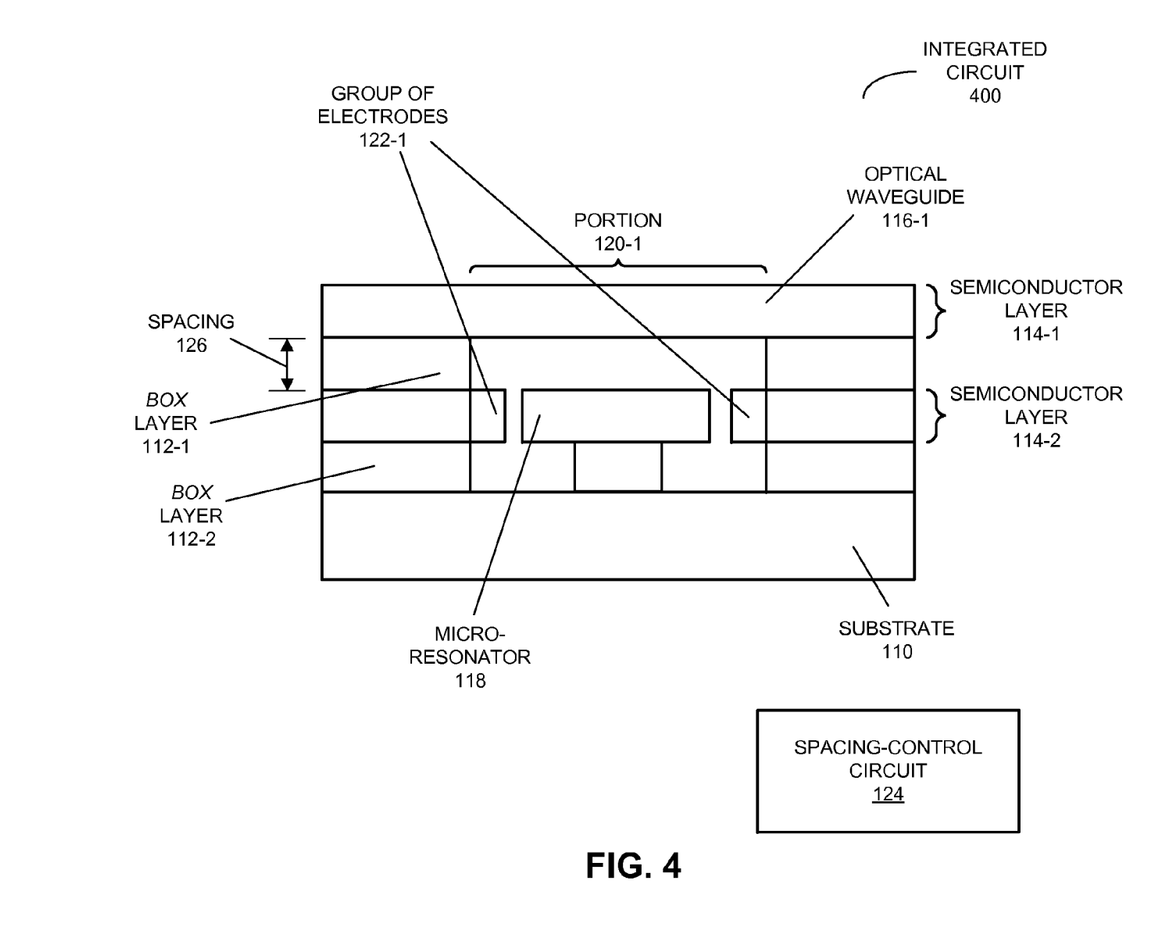
FIG. 4 is a block diagram illustrating a cross-sectional view of an optical switch in an integrated circuit in accordance with an embodiment of the present disclosure.
Figure 5:
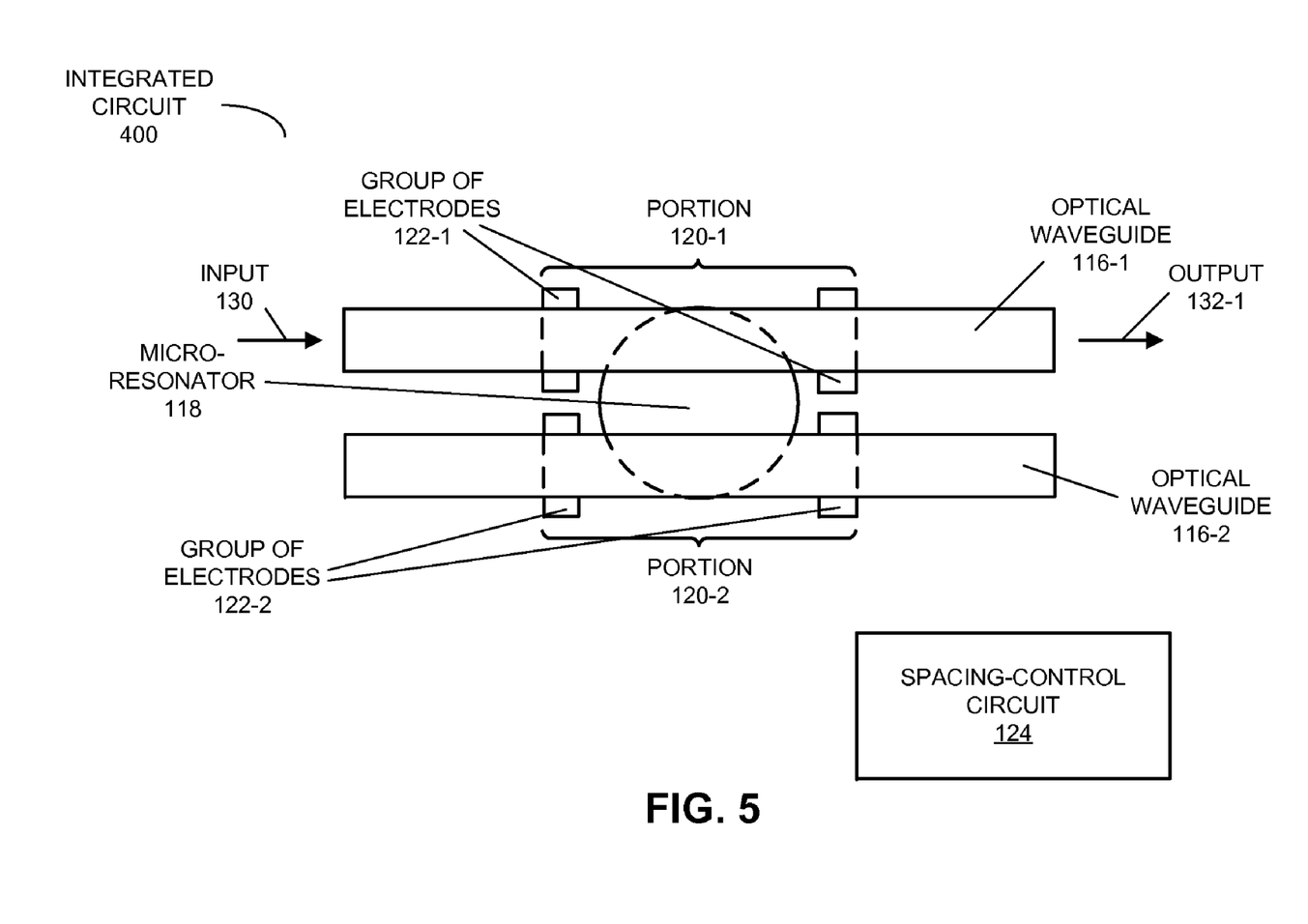
FIG. 5 is a block diagram illustrating a top view of the optical switch in the integrated circuit of FIG. 4 in accordance with an embodiment of the present disclosure.
Figure 6:
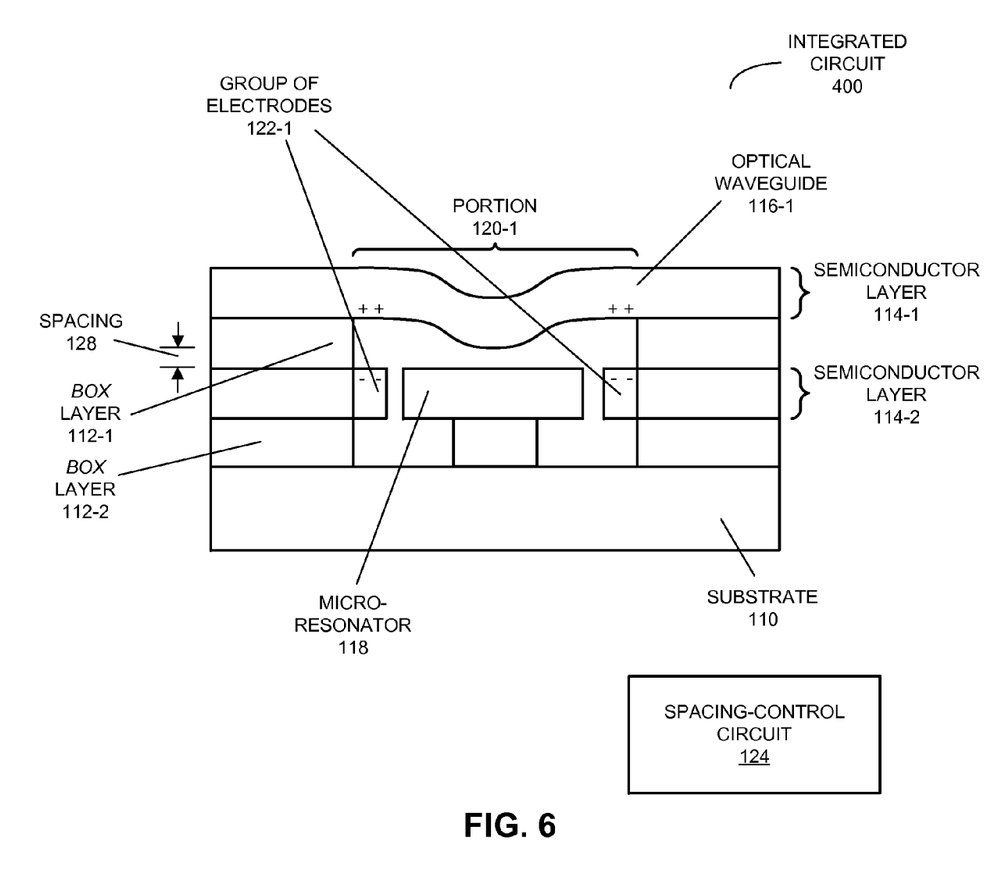
FIG. 6 is a block diagram illustrating a cross-sectional view of the optical switch in the integrated circuit of FIG. 4 in accordance with an embodiment of the present disclosure.

While FIGS. 1-3 illustrate in-plane displacement of portions 120 of optical waveguides 116, in other embodiments the displacement may be perpendicular to the plane. This is shown in FIG. 4, which presents a block diagram illustrating a cross-sectional view of an optical switch in integrated circuit 400; FIG. 5, which presents a block diagram illustrating a top view of the optical switch in integrated circuit 400 when the optical switch is open; and FIG. 6, which presents a block diagram illustrating a cross-sectional view of the optical switch in integrated circuit 400 when the optical switch is closed. In this embodiment, note that one or more groups of electrodes 122 and optical waveguides 116 may be defined on different layers (such as semiconductor layers 114-1 and 114-2). In addition, note that, when in the closed state, the optical signal circulates in micro-resonator 118 into the plane of FIG. 6.

Figure 7:
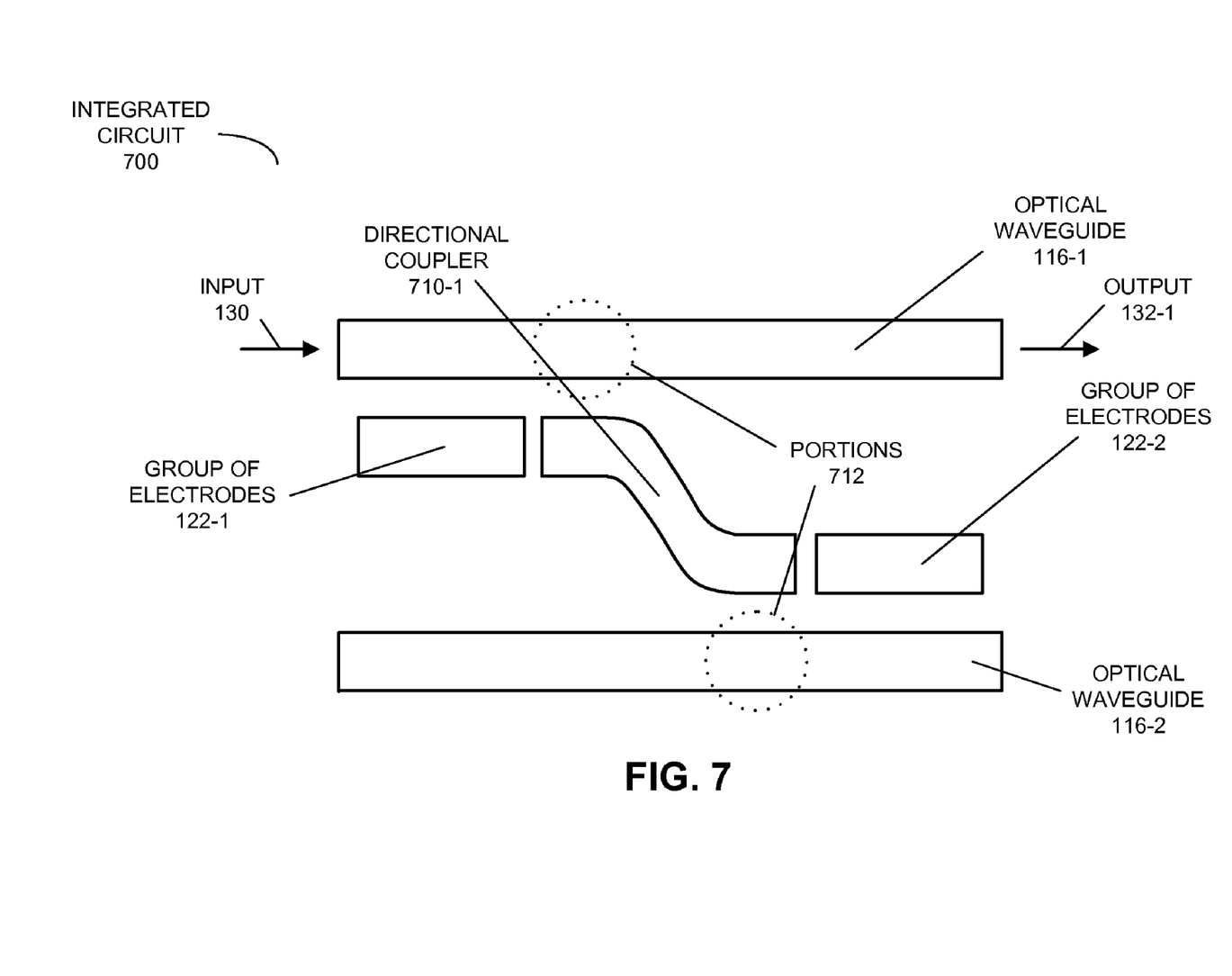
FIG. 7 is a block diagram illustrating an optical switch in an integrated circuit in accordance with an embodiment of the present disclosure.
Figure 8:
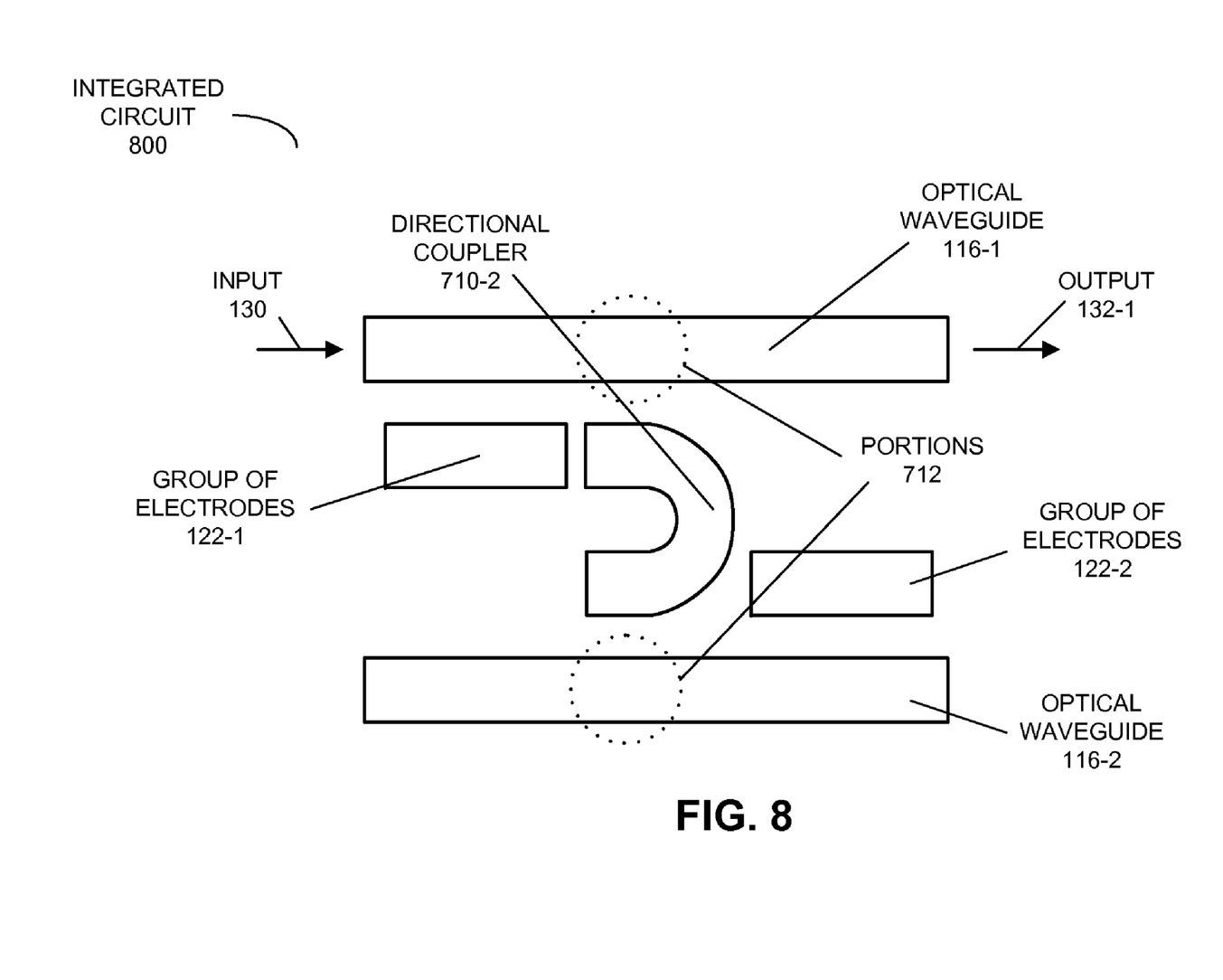
FIG. 8 is a block diagram illustrating an optical switch in an integrated circuit in accordance with an embodiment of the present disclosure.

Furthermore, in some embodiments (with displacement either in-plane or perpendicular to the plane of the optical switch), a directional coupler may be used instead of micro-resonator 118 (FIGS. 1-6). This is shown in FIG. 7, which presents a block diagram illustrating an optical switch in integrated circuit 700; and in FIG. 8, which presents a block diagram illustrating an optical switch in integrated circuit 800. Note that directional couplers 710 are each components that can optically couple the optical signal from one optical waveguide (such as optical waveguide 116-1) to another (such as optical waveguide 116-2) in a particular direction (such as in the same direction as input 130 or in the opposite direction as input 130) when the optical switch is closed. (Note that when the optical switch is closed, portions 712 of either or both optical waveguides 116 are displaced toward the directional coupler.) The optical coupling ratio is determined by the spacing between the two optical-waveguide coupling sections (i.e., portions 712 of optical waveguides 116 that are displaced when the optical switch is in the closed state). In order to have 100% optical coupling (i.e., 100% of the optical signal is transmitted from one optical waveguide to another), the size of a directional coupler (such as directional coupler 710-1) may be tens or hundreds of micrometers long and as wide as a pair of optical waveguides. Note that the actuation mechanism may be similar to that described previously (i.e., electrostatic). Thus, by controlling the application of electrical signal(s), the optical signal can be coupled or decoupled through portions 712 of optical waveguides 116 via a given directional coupler (i.e., the optical signal can be selectively switched).

The preceding embodiments of the optical switch may offer compact size and improved integration (such as in the integrated circuit). In particular, the optical switch may be significantly smaller and more easily integrated with silicon devices and circuits than: micro-mirror beam switches, so-called 'bubble' switches, planar lightwave circuit-based switches, or MZI optical-waveguide switches. Furthermore, the embodiments of the micro-resonator-based and the directional coupler-based optical switch can be fabricated with a length of tens of micrometers, which is approximately a thousand times smaller than existing micro-mirror optical switches.

Moreover, the preceding embodiments of the integrated circuit may have reduced power consumption because the electrostatic actuation in the MEMS optical switch consumes zero power at steady state, which is the dominant condition for an optical switch in a circuit-switching network.

Furthermore, the preceding embodiments of the integrated circuit may be temperature insensitive. In the micro-resonator-based optical switch, the optical switching occurs at highly over-coupling regions where the resonance spectra of the micro-resonator has a very small extinction ratio (peak-to-valley), which facilitates broadband optical switching. This helps reduce or eliminate the temperature sensitivity of the optical switch because changes in the resonance wavelength due to temperature will not significantly affect the output of the optical switch. For example, if the loss uniformity over an 80-nm range of wavelengths is 0.085 dB, then a change in the temperature may shift the locations of ripples in the transmittance, but the resulting change in the output power will be less than 0.085 dB. Consequently, tuning may not be needed for such a small output fluctuation, which may also reduce the power consumption. (However, in other embodiments the optical switch is thermally tuned and/or electrically tuned.)

Additionally, the preceding embodiments of the integrated circuit may have a high extinction ratio. In particular, the optical coupling between optical waveguides 116 and the intermediate component changes exponentially when the spacing(s) is changed using the electrical signal(s). Thus, in the absence of the electrical signal(s), the spacing is large enough so that there is negligible optical coupling (i.e., little or no light is switching) and a high extinction ratio can be achieved.

Figure 9:
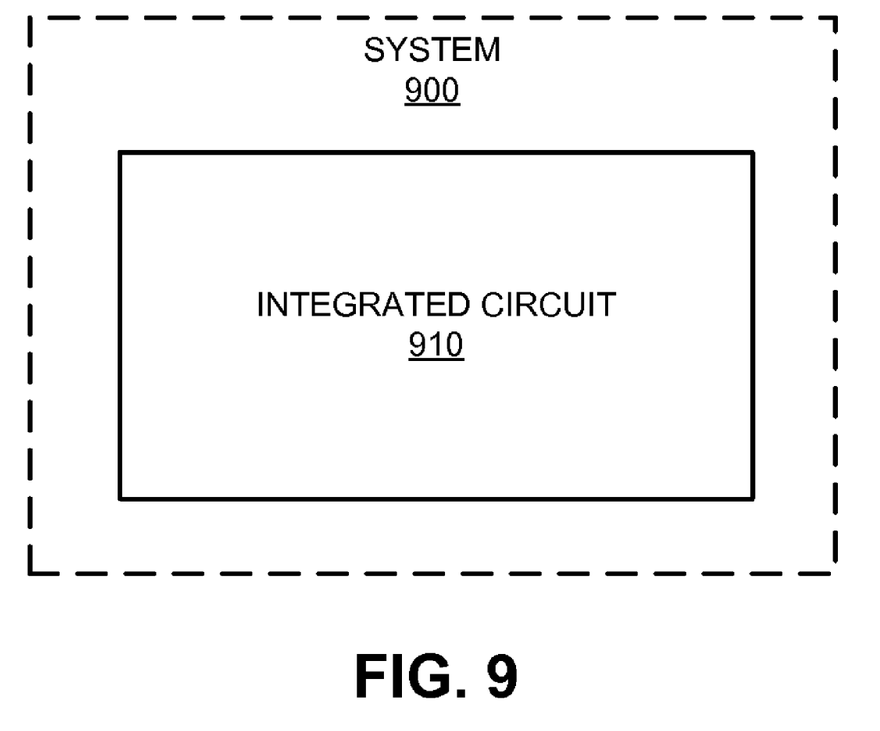
FIG. 9 is a block diagram illustrating a system that includes an integrated circuit in accordance with an embodiment of the present disclosure.

One or more of the preceding embodiments of the integrated circuit may be included in a system and/or an electronic device. This is shown in FIG. 9, which presents a block diagram illustrating a system 900 that includes integrated circuit 910 with the optical switch.

In some embodiments, one or more of the integrated circuits may be included in a multi-chip module (MCM) (such as a switch or a processor) and/or in a system that include the MCM. This MCM may include an array of chip modules (CMs) or single-chip modules (SCMs), and a given SCM may include at least one semiconductor die or substrate. Note that the MCM is sometimes referred to as a 'macro-chip.' Furthermore, the semiconductor die may communicate with other semiconductor dies, CMs, SCMs, and/or devices in the MCM using proximity communication of electromagnetically coupled signals (which is referred to as 'electromagnetic proximity communication'), such as capacitively coupled signals and/or proximity communication of optical signals (which are, respectively, referred to as 'electrical proximity communication' and 'optical proximity communication'). In some embodiments, the electromagnetic proximity communication includes inductively coupled signals and/or conductively coupled signals.

Furthermore, embodiments of the integrated circuit may be used in a variety of applications, including: VLSI circuits, communication systems (such as in wavelength division multiplexing), storage area networks, data centers, networks (such as local area networks), optical links, optical communication networks, intra-chip interconnections, inter-chip interconnections, and/or computer systems (such as multiple-core processor computer systems). For example, the integrated circuit may be included in a backplane that is coupled to multiple processor blades, or the optical switch may couple different types of components (such as processors, memory, input/output devices, and/or peripheral devices). In some embodiments, the optical switch in the integrated circuit performs the functions of: a hub, a bridge, and/or a router.

Note that system 900 may include, but is not limited to: a server, a laptop computer, a communication device or system, a personal computer, a work station, a mainframe computer, a blade, an enterprise computer, a data center, a portable-computing device, a supercomputer, a network-attached-storage (NAS) system, a storage-area-network (SAN) system, and/or another electronic computing device. Moreover, note that a given computer system may be at one location or may be distributed over multiple, geographically dispersed locations.

Integrated circuits in FIGS. 1-8 and/or system 900 in FIG. 9 may include fewer components or additional components. For example, semiconductor layers 114-1 and/or 114-2 in FIGS. 1 and 4 may include poly-silicon or amorphous silicon. Furthermore, note that micro-resonator 118 in FIGS. 1-6 may be: a micro-disk, a micro-ring, a racetrack resonator and/or another type of resonator. In some embodiments, the optical switch is implemented using discrete components (instead of in an integrated circuit), which may or may not include a semiconductor layer. In addition, in some embodiments, directional couplers 710 in FIGS. 7 and 8 may be used to provide an output directly (as opposed to coupling the optical signal to an output waveguide (such as optical waveguide 116-2 in FIGS. 7 and 8).

Note that a wide variety of fabrication techniques may be used to fabricate the integrated circuits in the preceding embodiments, as known to one of skill in the art.

Although these embodiments are illustrated as having a number of discrete items, the embodiments of the optical switch and the system are intended to be functional descriptions of the various features that may be present rather than structural schematics of the embodiments described herein. Consequently, in these embodiments two or more components may be combined into a single component, and/or a position of one or more components may be changed.

Figure 10:
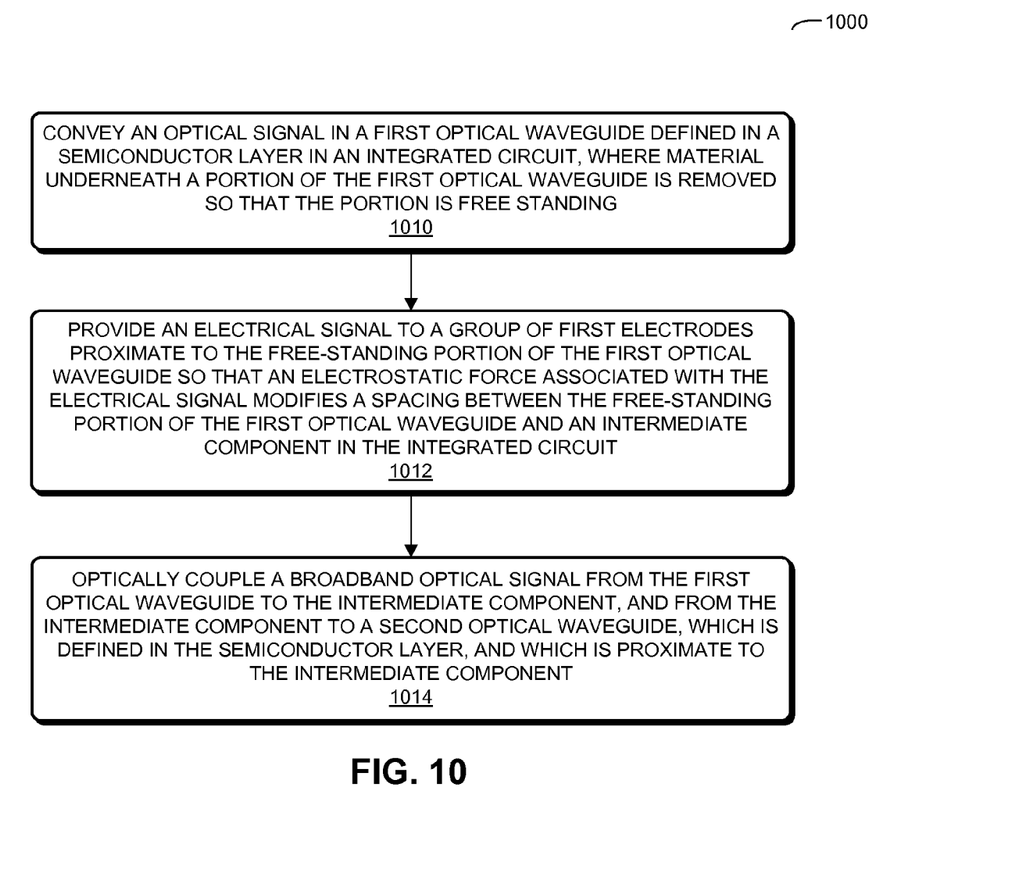
FIG. 10 is a flow chart illustrating a process for selectively optically coupling a broadband optical signal in accordance with an embodiment of the present disclosure.

We now describe the method. FIG. 10 presents a flow chart illustrating a process 1000 for selectively optically coupling a broadband optical signal in an integrated circuit. During this method, an optical signal is conveyed in a first optical waveguide defined in a semiconductor layer in an integrated circuit (operation 1010), where material underneath a portion of the first optical waveguide is removed so that the portion is free standing. Then, an electrical signal is provided to a group of first electrodes proximate to the free-standing portion of a first optical waveguide so that an electrostatic force associated with the electrical signal modifies a spacing between the free-standing portion of the first optical waveguide and an intermediate component in the integrated circuit (operation 1012), thereby substantially increasing optical coupling between the first optical waveguide and the intermediate component. Next, the broadband optical signal, which includes a range of wavelengths greater than a predefined value, is optically coupled from the first optical waveguide to the intermediate component, and is optically coupled from the intermediate component to a second optical waveguide (operation 1014). Note that the second optical waveguide is defined in the semiconductor layer, and is proximate to the intermediate component.

In some embodiments of process 1000, there may be additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising an optical switch, wherein the optical switch includes:
   a first optical waveguide and a second optical waveguide defined in a semiconductor layer, wherein a material underneath a portion of the first optical waveguide is removed so that the portion is free standing;
   an intermediate component positioned proximate to the first optical waveguide and the second optical waveguide;
   a group of first electrodes proximate to the free-standing portion of the first optical waveguide; and
   a spacing-control circuit, electrically coupled to the group of first electrodes, that is configured to apply an electrical signal to the group of first electrodes,
      wherein the spacing-control circuit includes a current source and the electrical signal includes a current; and
      wherein an electrostatic force associated with the electrical signal modifies a spacing between the free-standing portion of the first optical waveguide and the intermediate component, thereby substantially increasing optical coupling of a broadband optical signal, which includes a range of wavelengths greater than a predefined value, between the first optical waveguide and the intermediate component.

2. The integrated circuit of claim 1, wherein the predefined value is greater than 10 nm.

3. The integrated circuit of claim 1, wherein the semiconductor includes silicon.

4. The integrated circuit of claim 1, wherein the intermediate component includes a micro-resonator.

5. The integrated circuit of claim 1, wherein the intermediate component includes a directional coupler.

6. The integrated circuit of claim 1, wherein the spacing is associated with a displacement of the free-standing portion of the first optical waveguide in the plane of the semiconductor layer.

7. The integrated circuit of claim 1, wherein the spacing is associated with a displacement of the free-standing portion of the first optical waveguide perpendicular to the plane of the semiconductor layer.

8. The integrated circuit of claim 1, further comprising:
   a substrate; and
   a buried-oxide layer disposed on the substrate, wherein the semiconductor layer is disposed on the buried-oxide layer.

9. The integrated circuit of claim 8, wherein the substrate includes a semiconductor.

10. The integrated circuit of claim 8, wherein the substrate, the buried-oxide layer and the semiconductor layer comprise a silicon-on-insulator technology.

11. The integrated circuit of claim 1, wherein a material underneath a portion of the second optical waveguide is removed so that the portion is free standing;
   wherein the integrated circuit further includes another group of second electrodes proximate to the free-standing portion of the second optical waveguide;
   wherein the spacing-control circuit is electrically coupled to the other group of second electrodes, and is configured to apply another electrical signal to the other group of second electrodes; and
   wherein an electrostatic force associated with the other electrical signal modifies a spacing between the free-standing portion of the second optical waveguide and the intermediate component, thereby substantially increasing optical coupling of the broadband optical signal, which includes the range of wavelengths greater than the predefined value, between the second optical waveguide and the intermediate component.

12. The integrated circuit of claim 11, wherein the electrical signal is different than the other electrical signal.

13. A system, comprising an integrated circuit, wherein the integrated circuit includes:
   a first optical waveguide and a second optical waveguide defined in a semiconductor layer, wherein a material underneath a portion of the first optical waveguide is removed so that the portion is free standing;
   an intermediate component positioned proximate to the first optical waveguide and the second optical waveguide;
   a group of first electrodes proximate to the free-standing portion of the first optical waveguide; and
   a spacing-control circuit, electrically coupled to the group of first electrodes, that is configured to apply an electrical signal to the group of first electrodes,
      wherein the spacing-control circuit includes a current source and the electrical signal includes a current; and wherein an electrostatic force associated with the electrical signal modifies a spacing between the free-standing portion of the first optical waveguide and the intermediate component, thereby substantially increasing optical coupling of a broadband optical signal, which includes a range of wavelengths greater than a predefined value, between the first optical waveguide and the intermediate component.

14. The system of claim 13, wherein the predefined value is greater than 10 nm.

15. The system of claim 13, wherein the spacing is associated with a displacement of the free-standing portion of the first optical waveguide in the plane of the semiconductor layer.

16. The system of claim 13, wherein the spacing is associated with a displacement of the free-standing portion of the first optical waveguide perpendicular to the plane of the semiconductor layer.

17. The system of claim 13, wherein a material underneath a portion of the second optical waveguide is removed so that the portion is free standing;
wherein the integrated circuit further includes another group of second electrodes proximate to the free-standing portion of the second optical waveguide;
wherein the spacing-control circuit is electrically coupled to the other group of second electrodes, and is configured to apply another electrical signal to the other group of second electrodes; and
wherein an electrostatic force associated with the other electrical signal modifies a spacing between the free-standing portion of the second optical waveguide and the intermediate component, thereby substantially increasing optical coupling of the broadband optical signal, which includes the range of wavelengths greater than the predefined value, between the second optical waveguide and the intermediate component.

18. A method for selectively optically coupling a broadband optical signal in an integrated circuit, comprising:
conveying the optical signal in a first optical waveguide defined in a semiconductor layer in the integrated circuit, wherein a material underneath a portion of the first optical waveguide is removed so that the portion is free standing;
providing an electrical signal to a group of first electrodes proximate to the free-standing portion of the first optical waveguide so that an electrostatic force associated with the electrical signal modifies a spacing between the free-standing portion of the first optical waveguide and an intermediate component in the integrated circuit, thereby substantially increasing optical coupling between the first optical waveguide and the intermediate component, wherein providing the electrical signal comprises providing a current to the group of first electrodes; and
optically coupling the broadband optical signal, which includes a range of wavelengths greater than a predefined value, from the first optical waveguide to the intermediate component, and from the intermediate component to a second optical waveguide, which is defined in the semiconductor layer, and which is proximate to the intermediate component.

\* \* \* \* \*